(12) United States Patent
McDonald et al.

(10) Patent No.: US 6,978,464 B1
(45) Date of Patent: Dec. 20, 2005

(54) COMMUNICATING BETWEEN A PROCESS AND A DESTINATION

(75) Inventors: Jeffrey Wayne McDonald, Fremont, CA (US); Christopher Edwin Warren, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 354 days.

(21) Appl. No.: 09/684,768

(22) Filed: Oct. 6, 2000

Related U.S. Application Data

(60) Provisional application No. 60/158,262, filed on Oct. 7, 1999.

(51) Int. Cl.$^7$ ................................................. G06F 9/00
(52) U.S. Cl. ..................................................... 719/319
(58) Field of Search ........................ 709/313; 719/310, 719/319

(56) References Cited

U.S. PATENT DOCUMENTS

| | | | | |
|---|---|---|---|---|
| 5,379,426 | A | * | 1/1995 | Foss et al. ................... 709/315 |
| 5,511,199 | A | * | 4/1996 | Anthias et al. ............. 709/315 |
| 5,768,505 | A | * | 6/1998 | Gilchrist et al. ............ 709/201 |
| 5,794,039 | A | * | 8/1998 | Guck ....................... 707/103 R |
| 5,889,957 | A | * | 3/1999 | Ratner et al. ................ 709/227 |
| 5,890,140 | A | | 3/1999 | Clark et al. |
| 6,473,794 | B1 | | 10/2002 | Guheen et al. |

OTHER PUBLICATIONS

John Shapley Gray, Interprocess Communication in Unix, 1998, Prentice Hall PTR, Section 10.2.1, 10.4.2.*
Microsoft Corporation, Microsoft Workgroup Add-on For Window, 1991, Monotype coporation PLC, p. 27-28.*
Tandem computer(AD), Application Design Service Handbool, 1993.*
Watsen, Kent, et al., "Bamboo—Supporting Dynamic Protocols for Virtual Environments," presented at the 1998 Image Conference, Scottsdale, Arizona, Aug. 2-7, 1998.
Microsoft Workgroup Add-On for Windows, User's Guide, Microsoft Windows for Workgrow, Operating System Version 3.11, Sharing Printers by Using Print Manager, pp. 26-28. 1985-1993.
Gray, John Shapley, "Interprocess Communications in UNIX," Chapater 10.2 Communication Basics, pp. 271-292, Prentice Hall 1998, 2$^{nd}$ ed.

* cited by examiner

*Primary Examiner*—Meng-Al T. An
*Assistant Examiner*—LeChi Truong

(57) ABSTRACT

In a communication system with a first computer and a second computer, the first computer with a first process communicates with a destination on the second computer. The first computer receives destination information indicative of the destination from the first process. The first computer then determines a transport protocol for a message object based on the destination information. The first computer then generates the message object based on the destination information. The first computer receives message information indicative of a message to be transmitted from the first process to the destination. Finally, the first computer transmits the message information from the first process to the destination using the message object and the determined transport protocol. One advantage of determining the transport protocol at run-time is the transport protocol may be determined by an environment variable. This allows the system administrator to alter the transport without recompiling or modifying code.

35 Claims, 11 Drawing Sheets

COMMUNICATING BETWEEN A PROCESS AND A DESTINATION

RELATED APPLICATIONS

This application is a non-provisional application that claims the priority of prior provisional application Ser. No. 60/158,262, entitled "METHOD AND APPARATUS FOR PROVIDING SOFTWARE FRAMEWORKS", filed Oct. 7, 1999, which is hereby incorporated by reference into this application.

FEDERALLY SPONSORED RESEARCH OR DEVELOPMENT

Not applicable.

MICROFICHE APPENDIX

Not applicable.

BACKGROUND OF THE INVENTION

1. Field of the Invention

The invention is related to the field of communication systems, and in particular, to a communication system for communicating between a process and a destination.

2. Description of the Prior Art

With the expansion of client-server applications, the need for improved message handling between computers continues to increase. The Internet, object oriented programming, and distributed processing have also contributed to the demand for better message handling. Application developers use messaging Application Program Interfaces (API) to handle the messaging. Thus, the application developers only need a high-level understanding of the messaging and rely on the messaging API to handle the lower level messaging functions of the operating system.

One computer system called Tandem NonStop systems is a loosely-coupled parallel processor computer system designed to provide continuous availability for online transaction processing. This Tandem system uses a Guardian operating system. One feature of the Tandem computers is the Transaction Management Facility (TMF). If an error occurs downstream, the Tandem's TMF allows the transaction to be rolled back. This eliminates the need for error recovery code at multiple points in the system.

One messaging framework in the Tandem/Guardian environment is called NonStop Distributed Computing Environment (DCE). The NonStop DCE is a part of the Posix standard DCE. The NonStop DCE provides C functions for accessing services through a Remote Procedure Call (RPC) from one machine to a host machine. Another messaging framework is called Krypton. Krypton provides C functions for performing RMI similar to NonStop DCE. Krypton is available for Guardian, Unix, and Windows NT operating systems. Another messaging framework, Nonstop Domino (NS-DOM), provides C functions for invoking messaging services through the CORBA II API. One problem with the NonStop DCE, Krypton, and NS-DOM frameworks is the reliance on Interface Description Language (IDL) to generate functions. The developer must compile the IDL scripts through an IDL compiler to generate messaging functions.

Another prior art system called RMS shell, which was developed by Sprint Inc., handles messaging in Tandem computers. The RMS shell provides a messaging framework for creating client/server applications for the Tandem/Guardian environment. The RMS shell handles only one transport protocol to communicate between processes. The RMS shell posts and receives wait messages by specifying a pointer and length of the messages. When an originating process sends a wait message, the originating process waits for a reply from the target process instead of continuing processing. One problem with the RMS shell is the RMS shell only handles one type of transport protocol, process to pathway. One disadvantage is the RMS shell code is in C, a low level non-object oriented programming language. Those skilled in the art understand the benefits of object oriented programming languages such as maintenance and the ease of using objects to build applications. Another problem with the RMS shell is that it only correctly handles wait messaging, so the originating process must wait for replies. The RMS shell incorrectly handles no-waited messaging causing the RMS shell to drop transactions during high volume messaging. Another problem with RMS shell is that it only handles one type of message format.

SUMMARY OF THE INVENTION

The invention solves the above problems by communicating between a first process on a first computer and a destination on a second computer. The first computer receives destination information indicative of the destination from the first process. The first computer then determines a transport protocol for a message object based on the destination information. The first computer then generates the message object based on the destination information. The first computer receives message information indicative of a message to be transmitted from the first process to the destination. Finally, the first computer transmits the message information from the first process to the destination using the message object and the determined transport protocol.

In one embodiment, the destination is a second process on the second computer, where the transport protocol is a process to process communication. In another embodiment, the destination is a pathway to the second computer, where the transport protocol is a process to pathway communication. In still another embodiment, the destination is a socket on the second computer, where the transport protocol communication is a process to socket communication.

The message information is a pointer and length of the message in one embodiment. In another embodiment, the message is waited or nowait. In another embodiment, the first computer checks for errors and calls an error service in response to the error. The first computer also generates an unique identifier for the message.

One advantage of determining the transport protocol at run-time is the transport protocol may be determined by an environment variable. This allows the system administrator to alter the transport without recompiling or modifying code. Also, developers may add their own transport protocol without having to recompile application programs.

Another advantage is multiple messages formats are supported in a standardized way with the actual data format hidden from the user. The developer writes a single piece of code capable of interacting with multiple servers using different message formats and transport protocols.

Error services is another advantage which allows developers to distinguish error conditions and separate error handling logic from normal business logic. The ability to invoke error services is considered as exception handling across processes. Error notification allows the developer to either retry the offending logic or propagate the error further upstream.

DETAILED DESCRIPTION OF THE INVENTION

Figure 1:
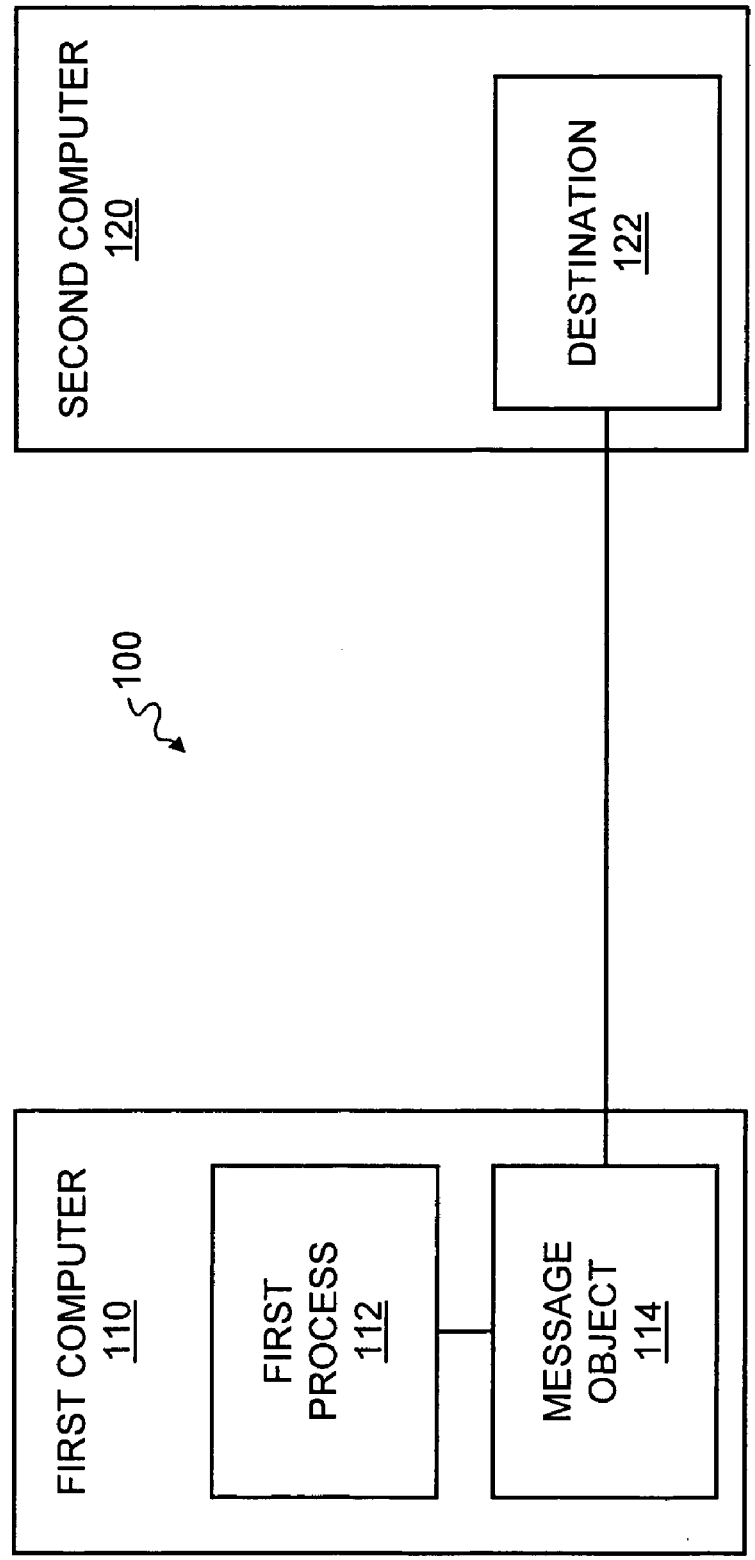
FIG. 1 is a block diagram of a communication system in an example of the invention.
Figure 2:
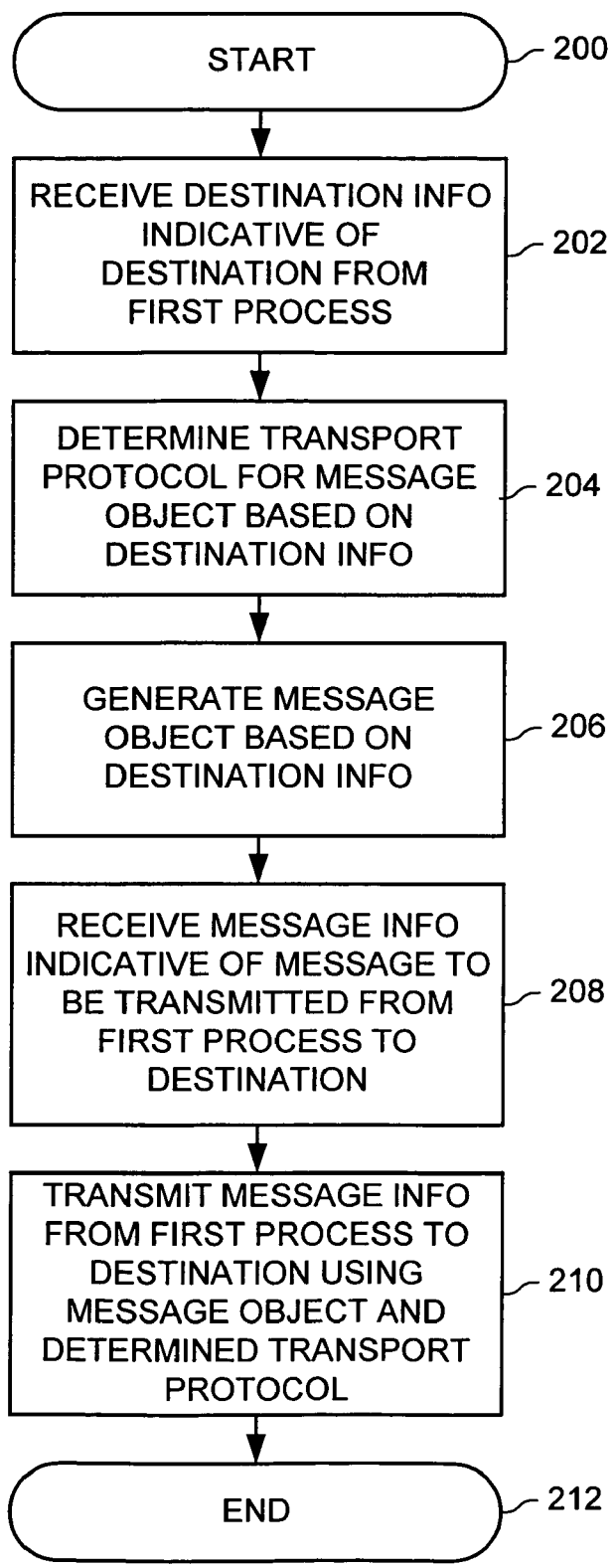
FIG. 2 is a flow chart of a communication system in an example of the invention.

Communication System—FIGS. 1–2

FIG. 1 depicts a block diagram of a communication system 100 in an example of the invention. The communication system 100 comprises a first computer 10 and a second computer 120. The first computer 110 comprises a first process 112 and a message object 114. The second computer 120 comprises a destination 122. The message object 114 is logically connected to the first process 112 and the destination 122.

The first computer 110 could be any computer configured to (1) receive destination information indicative of the destination 122 from the first process 112, (2) determine a transport protocol for a message object 114 based on the destination information, (3) generate the message object 114 based on the destination information, (4) receive message information indicative of a message to be transmitted from the first process 112 to the destination 122, and (5) transmit the message information from the first process 112 to the destination 122 using the message object 114 and the determined transport protocol. The first process 112 could be any process or application running on the first computer 110.

The destination 122 could be any target on the second computer 120 for communication with the first computer 110. Some examples of the destination 122 are a process, a pathway to the second computer 120, and a socket on the second computer 120. The destination information could be any information indicative of the destination 122. Some examples of the destination information are a process name, a pathway name, an Internet Protocol address, and a port number.

A message is any information or data to be communicated between the first computer 110 and the second computer 120. The message information could be any information indicative of the message. In some embodiments, the message information is the message itself. Some examples of the message information are a pointer to the message and the length of the message. The message object 114 could be any object used to transmit the message information to the destination. Objects are modules that contain data and instructions. Objects are the building blocks in object oriented programming.

The transport protocol could be any protocol for transmitting the message information to the destination 122 using the message object 114. Some examples of the transport protocols are process to process communication, process to pathway communication, and process to socket communication. Dynamically determining the transport protocol at run-time allows the transport protocol to be determined by an environment variable. This allows the system administrator to alter the transport without recompiling or modifying code. Also, new transport protocols can be added without recompiling or modifying code. The system administrator may have to relink a new transport into programs.

FIG. 2 depicts a flow chart of the communication system 100 in an example of the invention. FIG. 2 begins in step 200. In step 202, the first computer 110 receives destination information indicative of the destination 122 from the first process 112. In step 204, the first computer 110 determines the transport protocol for the message object 114 based on the destination information. In step 206, the first computer 110 then generates a message object 114 based on the destination information. In step 208, the first computer 110 receives message information indicative of a message to be transmitted from the first process 112 to the destination 122. The first computer 110 transmits the message information from the first process 112 to the destination 122 using the message object 114 and the determined transport protocol in step 210. FIG. 2 ends in step 212.

Dynamic Inter-Networked Guardian User's Service (DINGUS) Framework—FIGS. 3–11

FIGS. 3–11 disclose one embodiment of the invention, but the invention is not restricted to the configuration provided below. Those skilled in the art will appreciate numerous variations in a communication system configuration and operation that are within the scope of the invention. Those skilled in the art will also appreciate how the principles illustrated in this example can be used in other examples of the invention. A particular reference number in one figure refers to the same element in all of the other figures.

This embodiment is a framework which is written in C++ for Tandem's Guardian environment. This embodiment provides a standard communications interface for software development on the Tandem. The DINGUS framework comprises a Message class, an Application class, a Service class, and a Transport class. The Message class is discussed below in FIG. 8. The Application class and the Service class are discussed below in FIG. 9. The Transport class is discussed below in FIG. 10.

Process to Process

Figure 3:
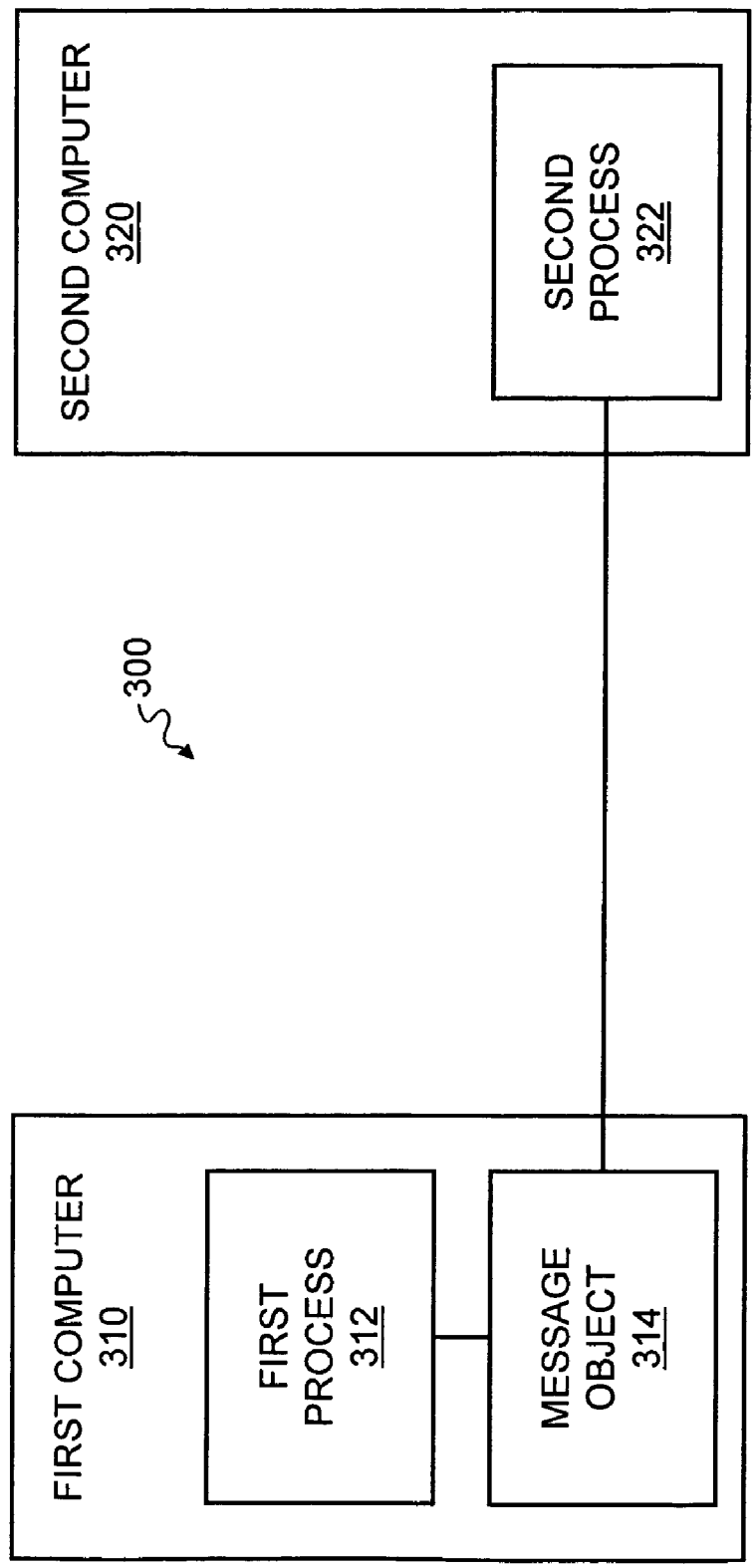
FIG. 3 is a block diagram of a communication system in a process to process communication in an example of the invention.
Figure 4:
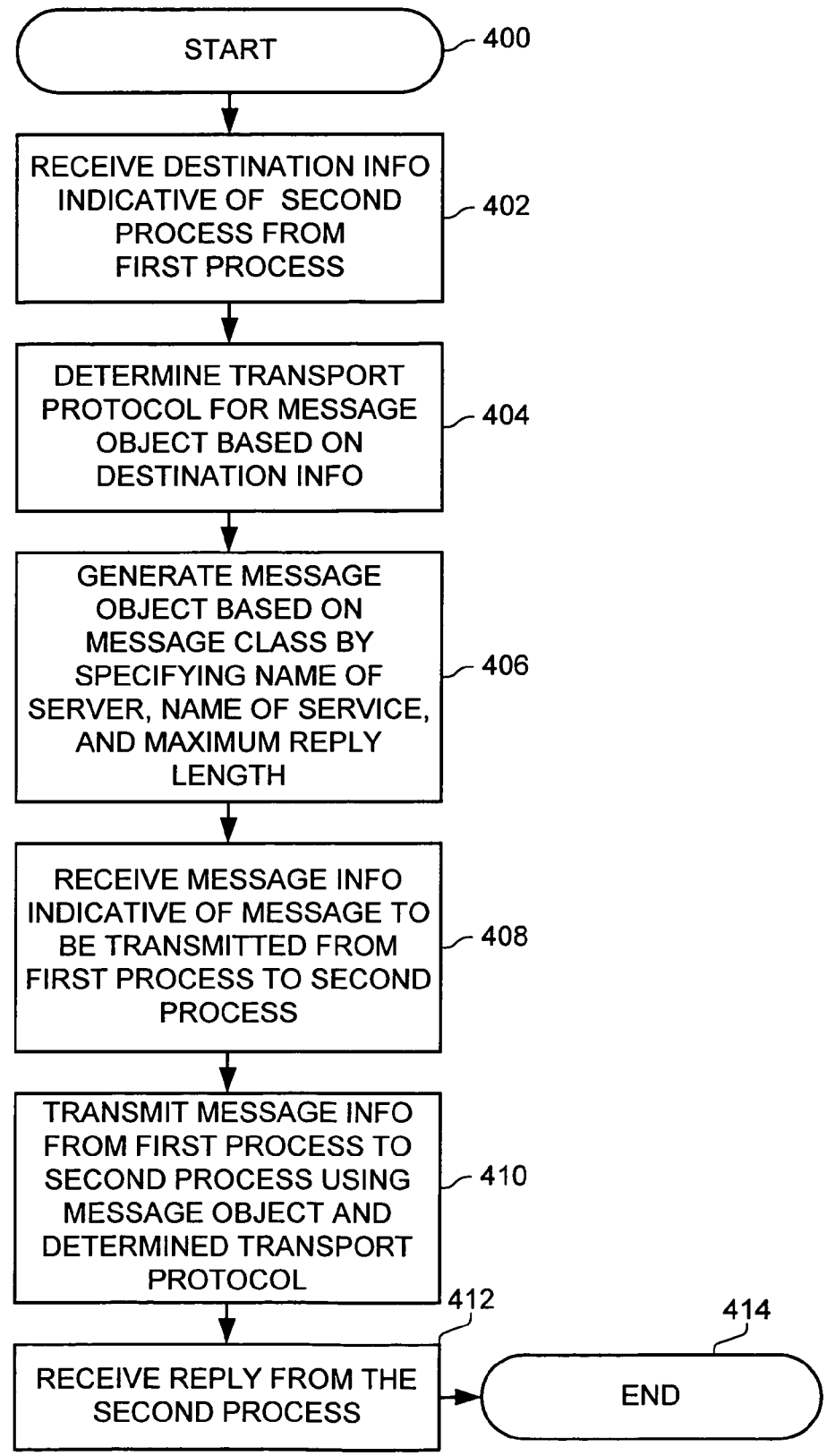
FIG. 4 is a flow chart for a communication system for a process to process communication for transmitting a message in an example of the invention.
Figure 5:
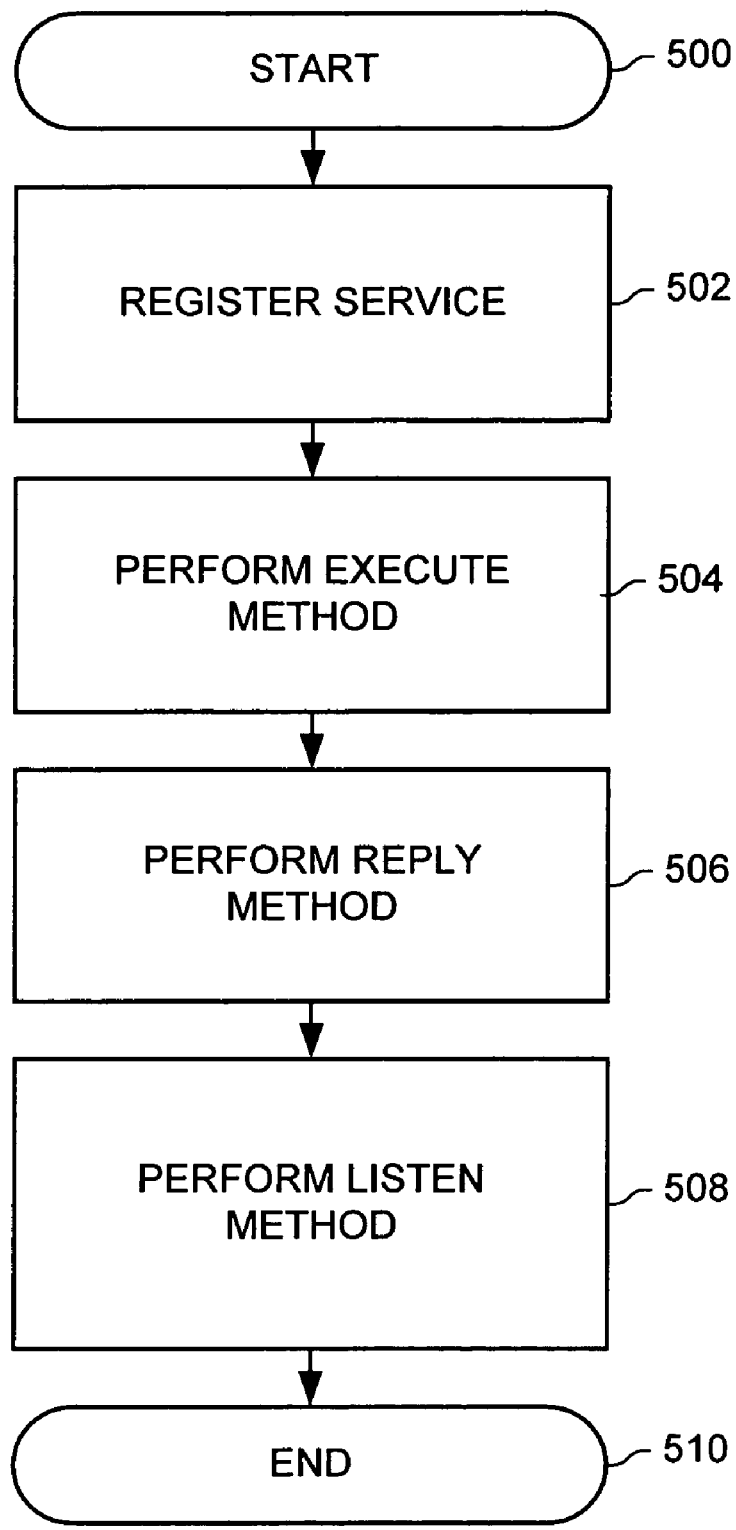
FIG. 5 is a flow chart for a communication system for a process to process communication for receiving a message in an example of the invention.

FIGS. 3–5 show an example of process to process communication in an example of the invention. FIG. 3 depicts a block diagram of a communication system 300 in process to process communication in an example of the invention. The communication system 300 comprises a first computer 310 and a second computer 320. The first computer 310 comprises a first process 312 and a message object 314. The second computer 320 comprises a second process 322. The message object 314 is logically connected to the first process 312 and the second process 322.

FIG. 4 depicts a flow chart for the communication system for process to process communication for transmitting a message in an example of the invention. FIG. 4 begins in step 400. This embodiment includes three message classes for I/O communication: Message, MessageSHELL, and MessageSDP. The Message class allows for communication to other computers running the DINGUS framework. The MessageSHELL class allows communication with a computer running the RMS shell. MessageSDP class provides communication to external systems through TEC, VECTOR, MQ, or CORBA. The Message SDP class formats message data to be used in conjunction with the SDP hublets.

FIG. 4 illustrates usage of the Message class. One constructor for the Message class is shown as:

Message (char*server, char*request, int reply length);

In order to create an instance of the Message class, the above constructor is specified with three parameters: the name of the server to communicate with, the name of the service to call, and the maximum reply length tolerated. In this embodiment, the name of the service is case sensitive and can not be more than 27 characters in length (28 if the terminating zero is counted). For unsupported message formats, the service name is "NULL" in the Message constructor, which transmits an unformatted message. If the message sent by the "post" method discussed below is formatted, then the communication can occur with another communication.

In step 402, the first computer 310 receives destination information indicative of the second process 322 from the first process 312. In this embodiment, the destination information is the name of the server to communicate with and the name of the service to call. In step 404, the first computer 310 determines the transport protocol for the message object 314 based on the destination information. In this embodiment, the determined transport protocol is process to process. In step 406, the first computer 310 generates a message object 314 based on the Message constructor by specifying the name of the server to communicate with, the name of the service to call, and the maximum reply length tolerated. In step 408, the first computer 310 receives message information indicative of a message to be transmitted from the first process 312 to the second process 322. In this embodiment, the message information is a pointer to the message and a length of the message.

The first computer 310 may transmit messages to the second computer 320 by a waited message or a nowait message. When sending a waited message, all processing is halted until the reply to the message is received. Waited messages may also be known as synchronous or blocking messages. With nowait messages, the first computer 310 performs other tasks such as SQL work or other messaging while waiting for the reply from the second computer 320.

In step 410, the first computer 310 transmits the message information for a waited message from the first process 312 to the second process 322 using the message object 314. The first computer 310 calls a "post" method of the message object 314. The "post" method accepts two parameters: the pointer to the waited message and the length of the message. An example of the "post" method is shown as:

char buf[ ]="this is an example message";
ms.post (buf, strlen(buf)+1);

For error checking, the first computer 310 checks for a Message error returned by the "post" method. The errors returned by the "post" method are system errors. One example is of error checking for the "post" method is shown as:

int error;
error=ms.post(data, length);
if(error) {296
    cout <<"Post failed due to file error: "<<error <<end1;
}

For advanced error handling, the first computer 310 uses an additional parameter in the Message constructor called the error service. This error service is an instance of a user defined service class which is called if a posted message should encounter an error.

The first computer 310 generates a unique identifier, a tag, for every message posted. The "getTag" method of the Message class returns this value. The tag is useful in associating the message posted with the message replied. One example of using the "getTag" method is shown as:

```
long global_tag;
...
ms0.post(data0, length0);
ms1.post(data1, length1);
global_tag = ms1.getTag( );
...
void ReplyHandler::execute(Message &ms) {
    if (ms.getTag( ) == global_tag)
        cout << "this is the reply to m1" << end 1;
    else
        cout<<"this must be the reply to m0" end1;
}
```

These tags are used to locate messages. Inbound messages are stored in a vector named "inbound" which is a static public data member of the Message class. All outbound messages are stored in a vector named "outbound". These two vectors provide freedom to maintain complicated nowait messaging schemes.

In step 412, the first computer 310 then receives a reply from the second process 322. The first computer 310 receives the reply using two methods: getBuffer and getBufferlength. The getBuffer method returns a pointer within the message object 314. The getBufferlength method returns the length of the reply. FIG. 4 ends in step 414.

For nowait messages, the first computer 310 uses the constructor below:

Message (string server, string request, int size, Service*reply). The constructor is similar to the constructor for the waited messages except for the last parameter, reply service. The reply service is a service to be called when the reply to the message "post" is returned.

FIG. 5 depicts a flow chart for the communication system 300 for process to process communication for receiving a message in an example of the invention. FIG. 5 begins in step 500. FIG. 5 uses two different classes: a Service class and an Application class. Both the Service class and the Application class are generic base classes from which other more complicated and useful classes can be derived. The Application class provides a framework from which an entire application is built. The Application class provides for listening of incoming messages and determines which services to execute. The Service class provides a framework from which individual services are built. Both the Service class and the Application class are discussed below in FIG. 9.

In step 502, the first computer 310 registers a service to enable calling from another process. In the Service class, the registerService method registers a unique name. In this embodiment, the name of the service is 27 characters or less. One example of the registerService method is shown as:

CharacterHandler chandler;
    chandler.registerService ("CharacterHandler");

If a request for a registered service comes in an unrecognizable format, a default request service can be specified. In this embodiment, a service with no name is registered for a default request service. One example of a default request service is shown as:

class UnknownHandler: public Service {

```
        public:
            Unknownhandler ( ) {
                registerService (NULL);
            }
            void execute (Message &ms) {
                cout << "unknown request" << end1;
                ms.reply (NULL, 0);
            }
    };
```

In step 504, the first computer 310 performs an "execute" method from the Service class. The "execute" method accepts the message object as a parameter for extraction, manipulation or replying back to the message object. The "execute" method performs no operations. However, the "execute" method is intended to be overridden by a developer. The developer can create a new class from the Service class and override the "execute" method. One example of the "execute" method is shown as:

class CharacterHandler: public Service{
        void execute(Message &msg);
    };

In step 506, the first computer 310 performs a "reply" method from the Message class. The "reply" method, which is similar to the "post" method, receives a message by accepting two parameters: a pointer to the message and the length of the message. One example of the "reply" method is shown as:

void CharacterHandler::execute (Message &ms) {

```
            char *buf;
            buf = (char *)malloc(ms.getLength( )+4);
            sprintf("<<%s>>", ms.getbuffer( ));
            ms.reply(buf, strlen(buf)+1);
            free(buf);
        }
```

For error checking, the first computer 310 checks for a Message error returned by the "reply" method. One example of error checking for the "reply" method is shown as:

int error;

```
    error = ms.reply(data, length);
    if (error) {
        cout << "Reply failed due to file error: "<< error << end1;
    }
```

In step 508, the first computer 310 performs a "listen" method from the Application class. The "listen" method provides a dispatch loop for a process. One example of the "listen" method is:

```
    void main(void) {
        Application app;
        app.listen( )
    }
```

For error checking, the first computer 310 checks for a Message error returned by the "listen" method. As long as there are either timers, registered services, or nowait replies expected, the "listen" method will continue to run until there is nothing left to do, or some sort of critical error is encountered that prevents it from operating. One example of error checking for the "listen" method is shown as:

```
    int main(void) {
        int error;
        Application app;
        error = app.listen( );
        if (error)
            cout << "critical listen error: "<< error;
        return error;
    }
```

Another Message class is MessageTIMER. MessageTIMER behaves similar to a regular message except that the message never actually goes anywhere. The reply service is called after a specified length of time. The constructor for a MessageTIMER accepts a reply service and a length of time measured in centiseconds. In this embodiment, macros convert DAYS, HOURS, MINUTES into centiseconds. One example of the MessageTIMER is shown as:

```
        MessageTIMER mt(MINUTES(5), reply);
        mt.post (data, length);
        . . .
        class TimerHandler:public Service {
            public:
                void execute(Message mt) {
                    char buf[80]'
                    static int count = 0;
                    cout << mt.getBuffer( ) << end1;
                    if(count < 5) {
                        count++;
                        sprintf(buf, "this is timer %1, count);
                        mt.post (buf, strlen(buf)+1);
                    }
                }
        };
```

Process to Pathway

Figure 6:
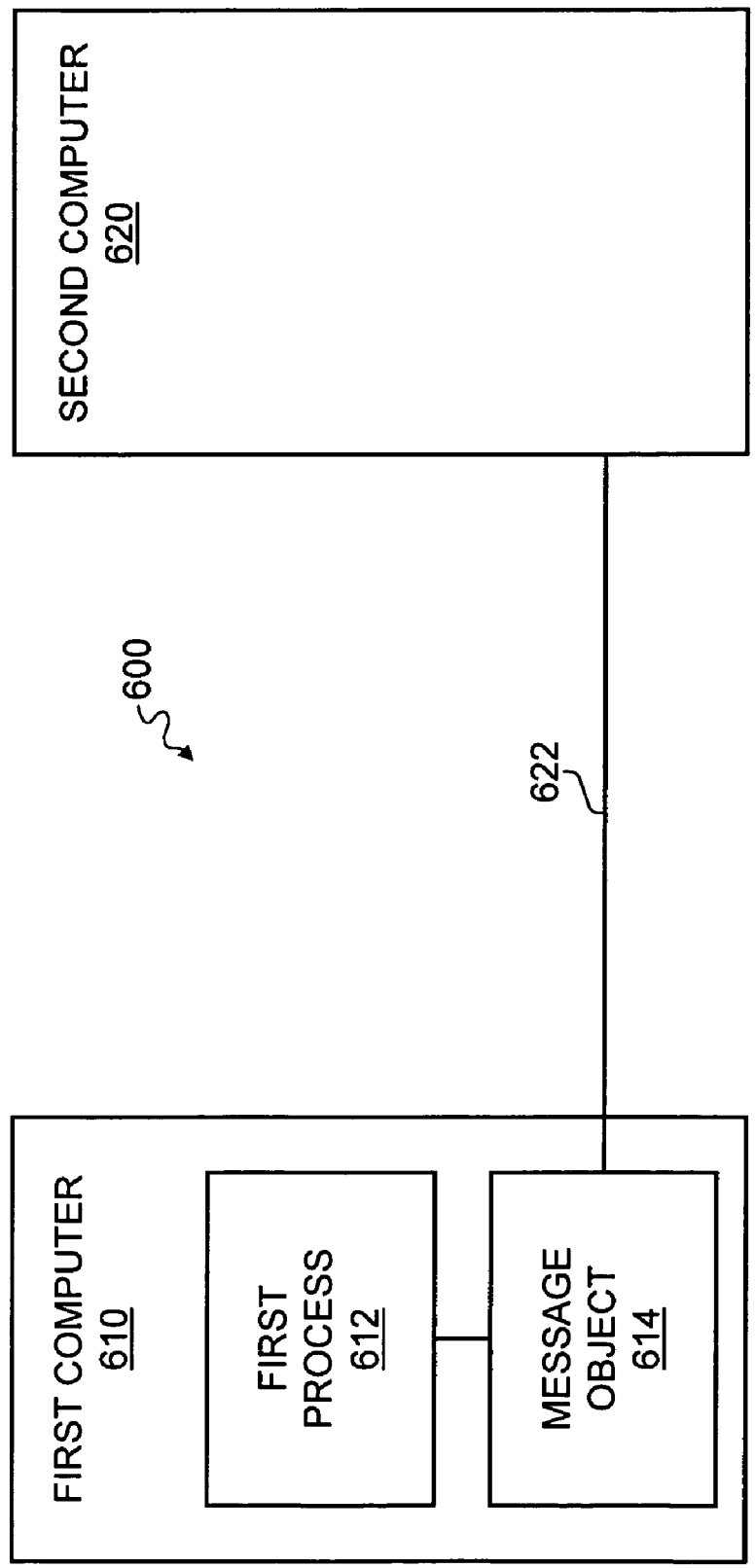
FIG. 6 is a block diagram of a communication system in a process to pathway communication in an example of the invention.

FIG. 6 shows an example of process to pathway communication in an example of the invention. FIG. 6 depicts a block diagram of a communication system 600 in process to pathway communication in an example of the invention. The communication system 600 comprises a first computer 610 and a second computer 620. The first computer 610 comprises a first process 612 and a message object 614. The message object 614 is logically connected to the first process 312 and a pathway 622. The pathway 622 is also connected to the second computer 620.

The operation of the process to pathway communication is similar to the operation of the process to process communication discussed above. One difference is that in the Message constructor, a SHELL style pathway name is specified. The pathway name comprises a pathmon and the server. In this embodiment, the pathmon name begins with the "#" symbol followed by a """ symbol and then the server name.

Process to Socket

Figure 7:
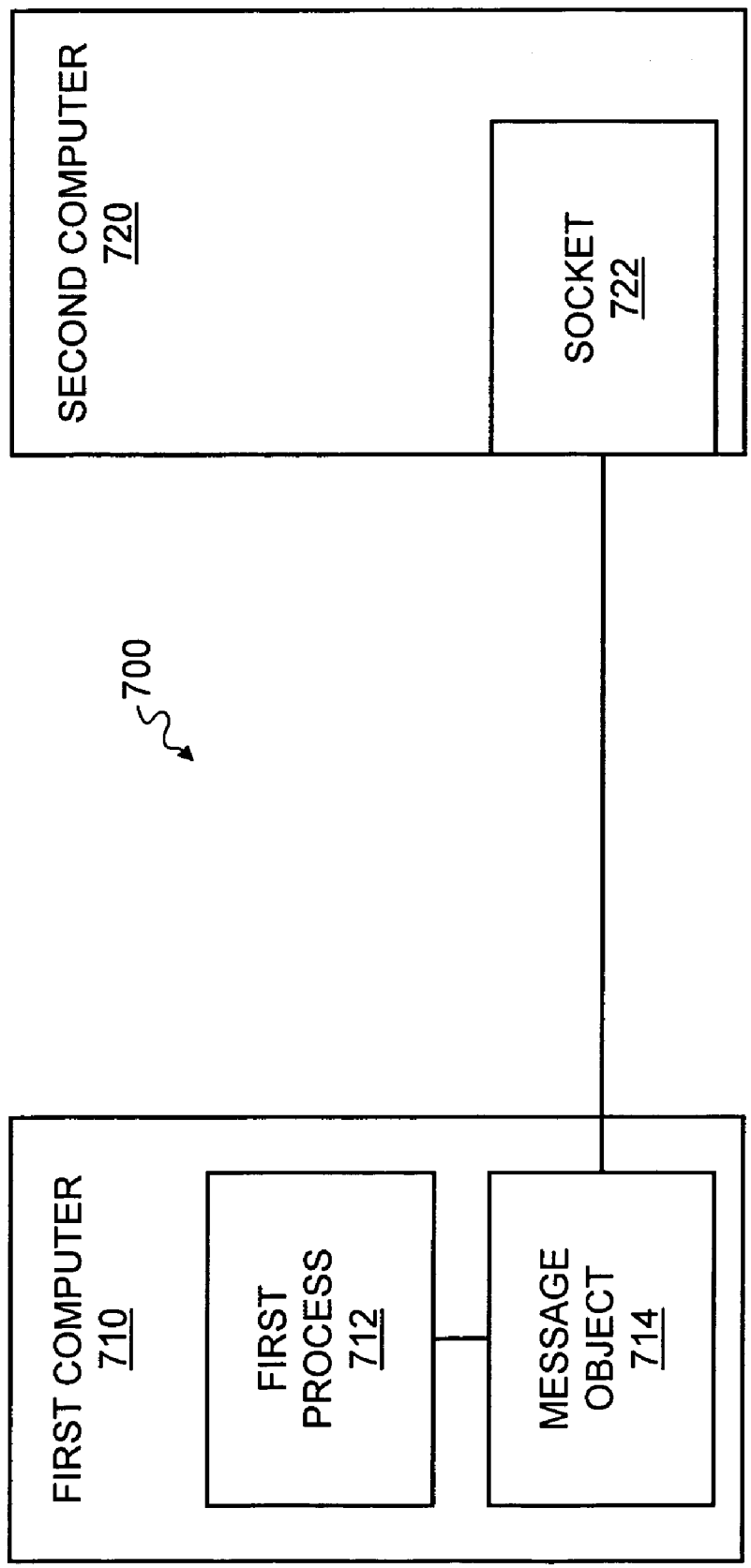
FIG. 7 is a block diagram of a communication system in a process to socket communication in an example of the invention.

FIG. 7 shows an example of process to socket communication in an example of the invention. FIG. 7 depicts a block diagram of a communication system 700 in process to socket communication in an example of the invention. The communication system 700 comprises a first computer 710 and a second computer 720. The first computer 710 comprises a first process 712 and a message object 714. The second computer 720 comprises a socket 722. The message object 714 is logically connected to the first process 712 and the socket 722.

The operation of the process to pathway communication is similar to the operation of the process to process communication discussed above. One difference is in the Message constructor an Internet Protocol address and a port number of the socket are specified. One example is shown as:

144.223.107.23:1066

Also, the "listen" method described above can listen on TCP/IP socket ports. The port number is specified in the "listenOn" method of the Application class. One example of the "listenOn" method is shown as

```
int main(void) {
    int error;
    Application app;
    error = app.listenOn ("127.0.0.1:1066");
    if (error)
        cout << "port unavailable:" << error << endl;
    error app.listen( );
}
```

Figure 8:
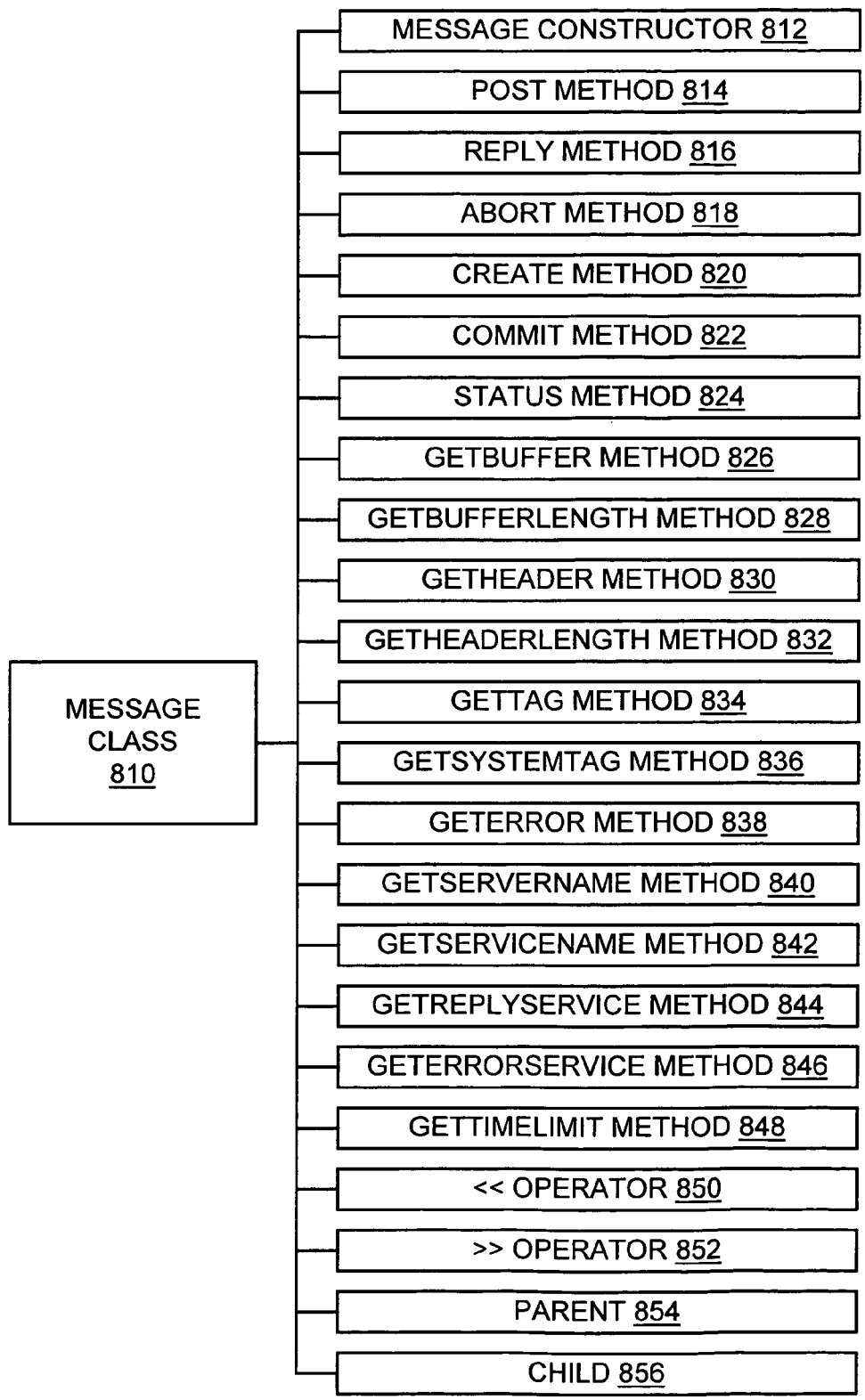
FIG. 8 is a block diagram of a Message class in an example of the invention.

FIG. 8 depicts a block diagram of the Message class in an example of the invention. A Message class 810 is connected to a Message constructor 812, a post method 814, a reply method 816, an abort method 818, a create method 820, a commit method 822, a status method 824, a getBuffer method 826, a getBufferLength method 828, a getHeader method 830, a getheaderlength method 832, a getTag method 834, a getSystemTag method 836, a getError method 838, a getServemame method 840, a getServiceName 842, a getReplyService method 844, a getErrorService method 846, a getTimelimit method 848, a <<operator 850, a>> operator 852, a parent method 854, and a children method 856.

The Message class 810 provides a method for formatting messages to be sent to a destination. Besides the Message base class, several other derived classes are included to handle various message formats.

The Message constructor 812 is shown as:

```
Message   (const char* server    = NULL,
           const char* service   = NULL,
           unsigned int size     = 0,
           Service* reply = NULL,
           Service* error = NULL,
           unsigned long timelimit = 0);
``` where the server parameter is a special character representation of the destination server; the service parameter is a character string representation of the destination service; the size parameter is the maximum number of expected bytes for the reply; the reply parameter is a service for nowait messages; the error parameter is called if an error is detected; and the timelimit parameter is the length of time a message remains active before the error service is called. The operation of the Message constructor 812 is discussed in further detail above.

The post method 814 is shown as:
void post (const void*buffer=NULL, unsigned int length=0);
where the buffer parameter is a pointer to an address in memory to be transmitted; and the length parameter is the number of bytes to be transmitted. The operation of the post method 814 is discussed in further detail above.

The reply method 816 is shown as:
void reply (const void*buffer=NULL, unsigned int length=0);
where the buffer parameter is a pointer to an address in memory to be received; and the length parameter is the number of bytes to be received. The operation of the reply method 816 is discussed in further detail above.

The abort method 818 rolls back TMF and sends reply data back to the porting server's error service. The abort method 818 is shown as:
void abort (const void*buffer=NULL, unsigned int length=0);
where the buffer parameter is a pointer to an address in memory to be transmitted;
and the length parameter is the number of bytes to be transmitted.

The create method 820 manually creates a TMF bracket to be associated with the Message object. The create method 820 is shown as:
void create(void).

The commit method 822 manually commits the TMF bracket associated with the Message Object. Since committing a TMF bracket is a nowait operation, a callback service must be provided if notification is required. The commit method 822 is shown as:
void commit (Service*callback=NULL).

The status method 824 returns the current TMF status of the Message. The status method 824 is shown as:
int status (void).
The status code includes internal error (−1), nil state (0), active (1), prepared (2), committed (3), aborting (4), aborted (5), and hung (6).

The getBuffer method 826 returns a pointer to the message buffer. The getBuffer method 826 is shown as:
Const char*getBuffer(void) const;

The getBufferlength method 828 returns the number of bytes contained within a message buffer. The getBufferlength method 828 is shown as:
unsigned int getBufferLength(void) const.

The getHeader method 830 returns a pointer to the message header. The getHeader method 830 is shown as:
const char*getHeader(void) const.

The getHeaderLength method 832 returns the number of bytes contained within a message header. The getHeaderLength method 832 is shown as:
unsigned int getHeaderLength(void) const.

The getTag method 834 identifies a unique tag number of a message object after a "post" method. The unique tag number is helpful in identifying a particular message. The getTag method 834 is shown as:
long getTag(void) const;

The getSystemTag method 836 returns the value of a system tag number defined by the operating system for inbound messages. The system tag number is useful in determining information about the message. The getSystemTag method 836 is shown as:

short getSystemTag(void) const;

The getError method 838 returns the error number of the last operation performed. The getError method 838 is shown as:

int getError(void) const;

The getServerName method 840 returns the "server" parameter supplied in the message constructor. The getServerName method 840 is shown as:

const char*getServerName(void) const;

The getServiceName method 842 returns the "service" parameter supplied in the message constructor. The getServiceName method 842 is shown as:

const char*getServiceName (void) const;

The getReplyService method 844 returns the "reply" parameter supplied in the message constructor. The getReplyService method 844 is shown as:

Service*getReplyService(void) const;

The getErrorService method 846 returns the "error" parameter supplied in the message constructor. The getErrorService method 846 is shown as:

Service*getErrorService(void) const;

The getTimelimit method 848 returns the "timelimit" parameter supplied in the message constructor. The getTimelimit method 848 is shown as:

Unsigned long getTimelimit 0 const;

The <<operator 850 copies the recognized object into the message buffer and calls either the "post" method or the "reply" method. Calling the <<operator 850 on an RWCollectable object calls the "saveGuts" method. The <<operator 850 is shown as:

void operator <<(const RWCollectable& object);
void operator <<(const char*object);

Although there is no "<<" equivalent to the abort method, the following shows the possibility of aborting a message and replying back at the same time:

msg.abort( );
msg <<object;

The >>operator 852 copies the buffer data into the recognized object. Calling the >>operator 852 on a RWCollectable object calls the "restoreGuts" method. Calling the >>operator 854 on a char*calls the "strcpy" function. The >>operator 852 is shown as:

void operator >>(RWCollectable &object) const;
void operator >>(char*object) const;

The parent 854 points to the inbound message for any outbound message object posted from within a request service. Using parent 854 helps to associate an outbound message with the inbound message that triggered its creation. If an inbound message has no associated outbound messages, the parent 854 points to "NULL". An example of the parent 854 is shown as:

```
void ExampleRequestService::execute (Message &inbound) {
    ...
    outbound.post(ptr,length)
}
void ExampleReplyService::execute (Message &outbound) {
    ...
    outbound.parent->reply (outbound.getBuffer( ),
    outbound.getBufferLenth( ));
}
```

The child 856 contains a list of all associated outbound messages if an inbound message object is a parent 854. Once an outbound message has been replied to, the outbound message is removed from the list of children 856. The child 856 is shown as:

```
Roster<Message> children;
One example of the child 856 is shown as
Void ExampleReplyService::execute (Message &out) {
    ...
    if (out.parent->children.length( ) == 0) {
        out.parent->reply (ptr, len);
    }
}
```

Figure 9:
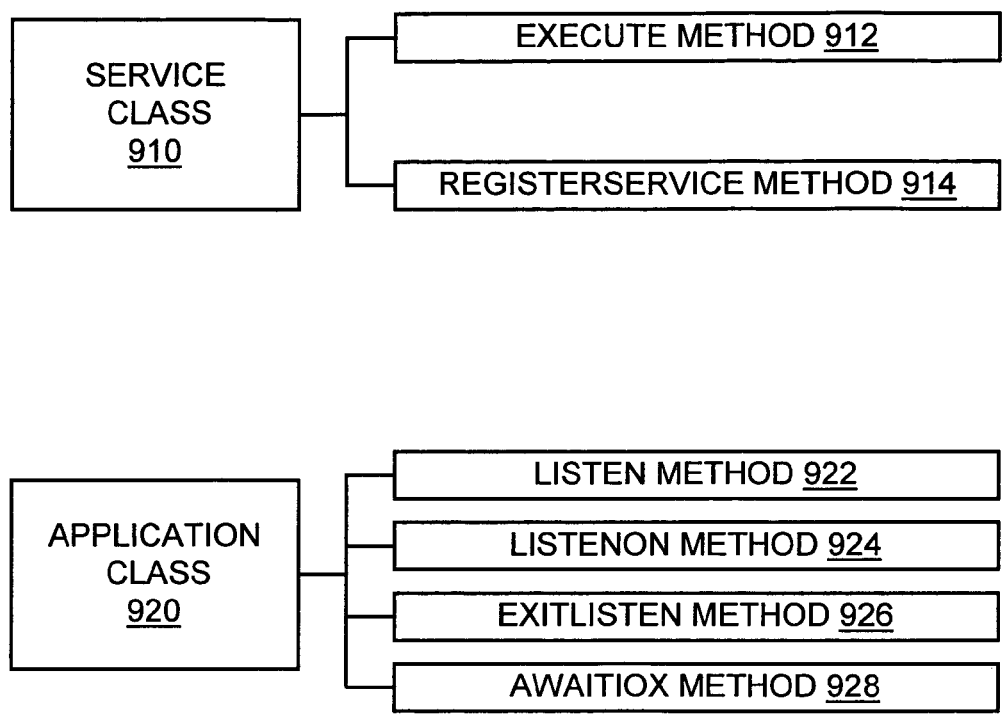
FIG. 9 is a block diagram of a Service class and an Application class in an example of the invention.

FIG. 9 depicts a block diagram of a Service class 910 and an Application class 920 in an example of the invention. The Service class 910 is connected to an execute method 912 and a registerService method 914. The Application class 920 is connected to a listen method 922, a listenOn method 924, a exitListen method 926, and an awaitiox method 928.

The Service class 910 is a generic base class meant to be used to derive more powerful services. The execute method 912 is intended to be overridden by the user. The user places application logic within the execute method 912. The execute method 912 is shown as:

virtual void execute(Message &msg);

The "msg" parameter is a reference to either an inbound or outbound message object depending upon the situation. Registered services reference inbound messages. Reply or error services reference outbound messages.

The registerService method 914 allows a registered service to be called by external processes. Reply or error services are not registered. The registerService method 914 is shown as:

virtual void registerService (const char*name=NULL),
unsigned int value=tmf::propagate|reply::late);

The "name" parameter matches the "service" parameter of the Message constructor exactly. In this embodiment, the name parameter is limited to 27 characters. If the service is registered with no name, a default request service is created. All unformatted messages are directed to this default request service. Services with multiple names may be registered, but multiple services may not be registered with the same name. One example of the value parameter is shown as:

```
class tmf {
    public:
        enum {  none        = 0x00,
                propagate   = 0x01,
                create      = 0x02,
                automatic   = 0x03 };
};
class reply {
    public:
        enum {  late    = 0x00,
                early   = 0x04};
};
```

The Application class 920 performs all of the message routing tasks. The Application class 920 performs initialization. The listen method 922 is a loop that listens for inbound messages and replies to outbound messages and directs the messages to the proper service. The listen method 922 returns successfully if there are no registered services and there are no pending outbound messages. The listen method 922 returns with an error code on any recoverable error. Because the listen method 922 is a loop, the listen method 922 should not be placed within another loop. Calling the listen method 922 again after the listen method 922 has terminated does not yield any new results. The listen method 922 is shown as:
   int listen(void);

The listenOn method 924 allows users to listen on any supported transport. The listenOn method 924 is shown as:
   int listenOn (char*server);

The server parameter is a character string representing the protocol used to listen for incoming messages. Listening on "$receive" happens automatically upon instantiating an Application object.

The exitListen method 926 allows the user to terminate the listen method. The exitListen method 926 is shown as:
   static void exitListen(int error);

The awaitiox method 928 is intended to be overridden by the user. If the listen loop encounters an unknown signal, the awaitiox method 928 is called to be handled by the user. All of the parameters found within the awaitiox method 928 correspond to the Guardian procedure called "awaitiox". The awaitiox method 928 is shown as:

```
virtual void awaitiox (_cc_status cc_error,
                       short filenum,
                       long *buffer,
                       short count,
                       long tag,
                       short segment_id);
```

The cc_error parameter is the value returned by the awaitiox function from within the listen loop. The filenum parameter represents the file number of the I/O event. The buffer parameter is a pointer to memory containing data written during the I/O event. The tag parameter is the same tag value used by the function that initiated the I/O event. The segment_id parameter represents the memory segment reference by the I/O event.

Figure 10:
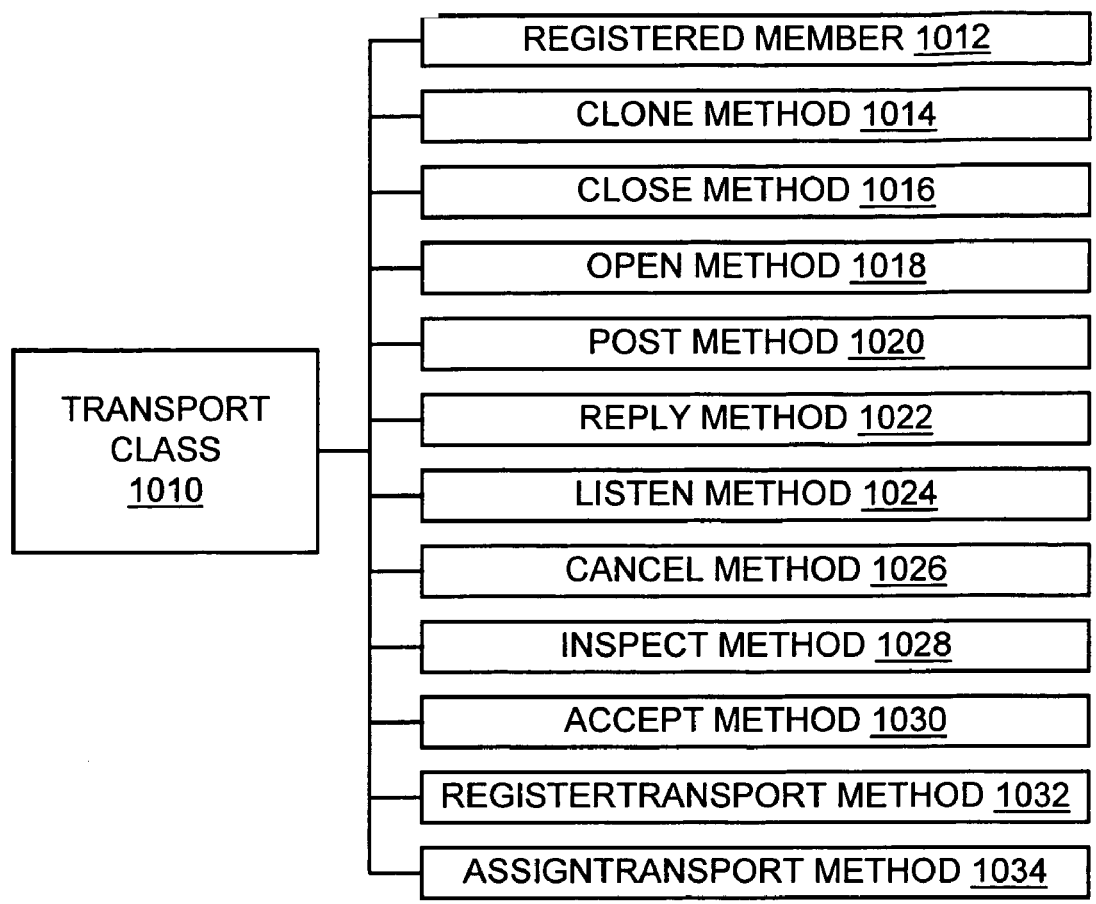
FIG. 10 is a block diagram of a Transport class in an example of the invention.

FIG. 10 depicts a block diagram of a Transport class 1010 in an example of the invention. The Transport class 1010 is connected a registered data member 1012, a clone method 1014, a close method 1016, an open method 1018, a post method 1020, a reply method 1022, a listen method 1024, a cancel method 1026, an inspect method 1028, an accept method 1030, a registerTransport method 1032, and an assignTransport method 1034. The Transport class 1010 provides methods for sending and receiving messages from other processes. Process to process, process to pathway, process to socket transport protocols are supplied, but other transport protocols may be added. Registering a transport makes it available to be used by the Message class.

The registered data member 1012 is a list that contains an instance of each derived Transport class available for use. The clone method 1013 calls the copy constructor. The close method 1016 closes the derived transport mechanism. The open method 1018 opens the derived transport mechanism. The post method 1020 sends data through the derived transport mechanism. The reply method 1022 sends data back through the derived transport mechanism. The listen method 1024 reads data from the derived transport mechanism. The cancel method 1026 provides a way of cancelling an outstanding message.

The inspect method 1028 completes the call to listen. The inspect method 1028 performs any clean up activities required after reading data from the derived transport mechanism. The accept method 1030 returns true if the server name of the message object matches the derived transport's naming convention. The registerTransport method 1032 places a transport object onto the registered linked list. The assignTransport method 1034 accepts a server name and searches the registered list for a transport object that will accept. If a match is found, the clone method 1014 is called and a copy of that object is returned. The assignTransport method 1034 allows message objects to obtain a fresh transport dynamically without knowing the actual transport mechanism to be used.

Figure 11:
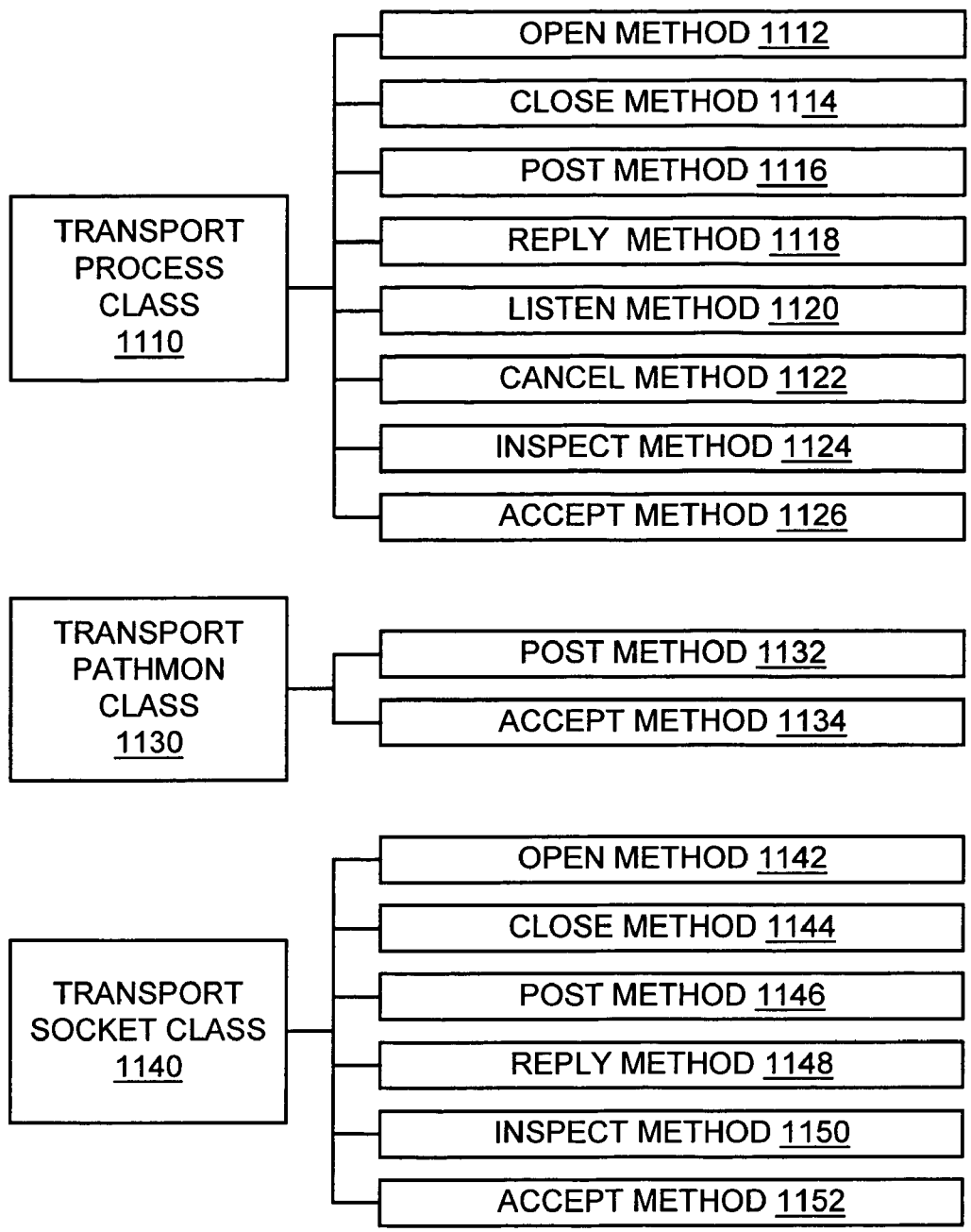
FIG. 11 is a block diagram of a TransportProcess class, a TransportPathmon class, and a TransportSocket class in an example of the invention.

The Transport class 1010 also comprises the TransportProcess class, the TransportPathmon class, and the TransportSocket class in FIG. 11. FIG. 11 depicts a block diagram of a TransportProcess class 1110, a TransportPathmon class 1130, and a TransportSocket class 1140 in an example of the invention. The Transport class 1110 is connected to an open method 1112, a close method 1114, a post method 1116, a reply method 1118, a listen method 1120, a cancel method 1124, and an accept method 1126. The TransportPathmon class 1130 is connected to a post method 1132 and an accept method 1134. The TransportSocket class 1140 is connected to an open method 1142, a close method 1144, a post method 1146, a reply method 1148, an inspect method 1150, and an accept method 1152.

The TransportProcess class 1010 provides the read/write functionality for process to process communication. The open method 1112 calls FILE_OPEN_. The close method 1114 calls FILE_CLOSE_. The post method 1116 calls WRITEREADX. The reply method 1118 calls REPLYX. The listen method 1120 calls READUPDATEX. The cancel method 1122 call CANCELREQ. The inspect method 1124 determines the system message tag. The accept method 1126 returns true if the server name fits the Guardian process name syntax.

The TransportPathmon class 1130 provides write functionality for Pathway communication. The post method 1132 call SERVERCLASS_SEND_. The accept method 1134 returns true if a server name contains a "#" symbol followed by a pathmon name, followed by a "^" symbol, followed by a server-class name.

The TransportSocket class 1140 provides read/write functionality for TCP/IP sockets. The open method 1142 calls connect_nw for postable messages. The open method 1142 call bind_nw, listen, for readable messages. The close method 1144 call FILE_CLOSE_. The post method 1146 calls send_nw followed by recv_nw. The reply method 1148 calls send_nw. The inspect method 1150 sets the message service name to either TCP/IP spawn if the server is to spawn a new process, or "CompleteSocketConnection" if it is not. The accept method 1152 returns true if the server name is an IP address followed by a ":" and a port number.

By dynamically determining the transport protocol at run-time, the transport protocol may be determined by an environment variable. This allows the system administrator to alter the transport without recompiling or modifying code. The developer can also add transport protocols or message objects.

Another advantage is multiple messages formats in a standardized way with the actual data format hidden from the user. The developer writes a single piece of code capable of interacting with multiple server using different message formats and transport protocols.

Another advantage is the handling of both waited and nowait messages. With the option of wait or nowait messages, the developer then can write more powerful and efficient applications.

Error services is another advantage which allows developers to distinguish error conditions and separate error handling logic from normal business logic. The ability to invoke error services is considered as exception handling across processes. Error notification allows the developer to either retry the offending logic or propagate the error further upstream.

Automatically associating each incoming TMF bracket with all outgoing messages within a logical thread allows developers to rollback database work in the event of an error within a process or across processes.

Another advantage of this embodiment is the code is written in C++, a high level programming language. This provides a standard communications interface for software development on the Tandem computers. Those skilled in the art understand the benefits of object oriented programming languages such as maintenance and the ease of using objects to build applications. The code is also Native Mode compatible. The DINGUS framework reduces the complexity required to write multi-threaded applications in a Tandem environment. The ease of use of the DINGUS framework and the object oriented programming reduces the time to build applications. The DINGUS framework also abstracts the platform specific messaging of the Tandem machine, so non-Tandem programmers can build applications in the Tandem environment.

The above-described elements can be comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. Those skilled in the art are familiar with instructions, processor, and storage media.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of communicating between a first process on a first computer and a destination on a second computer, the method comprising:
   receiving an environment variable from the first process wherein the environment variable comprises destination information indicative of the destination;
   determining a transport protocol at run-time for a message object based on the destination information by selecting one of process to process transport protocol, a process to pathway transport protocol, or a process to socket transport protocol, wherein the second computer comprises a Tandem parallel processor computer system and wherein the destination operates within a Guardian operating environment;
   generating the message object based on the destination information;
   receiving a pointer to a message to be transmitted from the first process to the destination;
   transmitting the message from the first process to the destination using the message object and the determined transport protocol;
   generating a tag associated with the message object transmitted from the first process to the destination; and
   storing the tag in an outbound message vector.

2. The method of claim 1 wherein the destination comprises a second process on the second computer.

3. The method of claim 2 wherein the destination information comprises a name of the second process on the second computer.

4. The method of claim 2 wherein the tort protocol comprises process to process.

5. The method of claim 1 wherein the destination comprises a pathway to the second computer.

6. The method of claim 5 wherein the destination information comprises a name of the pathway to the second computer.

7. The method of claim 5 wherein the transport protocol comprises process to pathway.

8. The method of claim 1 wherein the destination comprises a socket on the second computer.

9. The method of claim 8 wherein the destination information is an address of the second computer.

10. The method of claim 9 wherein the address comprises an Internet Protocol address.

11. The method of claim 9 wherein the address comprises a port number of the socket.

12. The method of claim 8 wherein the transport protocol comprises process to socket.

13. The method of claim 1 further comprising checking for errors.

14. The method of claim 13 further comprising calling an error service in response to the error.

15. The method of claim 1 further comprising generating a unique identifier for the message.

16. The method of claim 1 further comprising receiving a reply from the second computer.

17. The method of claim 1 further comprising registering a service.

18. The method of claim 1 further comprising receiving the message from the first process into the destination.

19. A software product for communicating between a first process on a first computer and a destination on a second computer, comprising:
   communication software operational when executed by a processor to direct the processor to receive an environment variable from the first process wherein the environment variable comprises destination information indicative of the destination, at run-time determine a transport protocol for a message object based on the destination information by selecting one of process to process transport protocol, a process to pathway transport protocol, or a process to socket transport protocol wherein the second computer comprises a Tandem parallel processor computer system and wherein the destination operates within a Guardian operating environment, generate the message object based on the destination information, receive a pointer to a message to be transmitted from the first process to the destination, transmit the message from the first process to the destination using the message object and the determined transport protocol, generate a tag associated with the message object transmitted from the first process to the destination, and store the tag, in an outbound message vector; and
   a software storage medium operational to store the communication software.

20. The software product of claim 19 wherein the destination comprises a second process on the second computer.

21. The software product of claim 20 wherein the destination information comprises a name of the second process on the second computer.

22. The software product of claim 20 wherein the transport protocol comprises process to process.

23. The software product of claim 19 wherein the destination comprises a pathway to the second computer.

24. The software product of claim 23 wherein the destination information comprises a name of the pathway to the second computer.

25. The software product of claim 23 wherein the transport protocol comprises process to pathway.

26. The software product of claim 19 wherein the destination comprises a socket on the second computer.

27. The software product of claim 26 wherein the destination information is an address of the second computer.

28. The software product of claim 27 wherein the address comprises an Internet Protocol address.

29. The software product of claim 27 wherein the address comprises a port number of the socket.

30. The software product of claim 26 wherein the transport protocol comprises process to socket.

31. The software product of claim 19 wherein the communication software is operational when executed by the processor to direct the processor to check for errors.

32. The software product of claim 31 wherein the communication software is operational when executed by the processor to call an error service in response to the error.

33. The software product of claim 19 wherein the communication software is operational when executed by the processor to generate a unique identifier for the message.

34. The software product of claim 19 wherein the communication software is operational when executed by the processor to receive a reply from the second computer.

35. The software product of claim 19 wherein the communication software is operational when executed by the processor to register a service.

* * * * *